United States Patent
Silenius et al.

(10) Patent No.: US 6,251,222 B1
(45) Date of Patent: *Jun. 26, 2001

(54) FILLER FOR USE IN PAPER MANUFACTURE AND PROCEDURE FOR PRODUCING A FILLER

(75) Inventors: Petri Silenius, Kirkniemi; Markku Leskela, Lohja as, both of (FI)

(73) Assignee: Metsa-Serla (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,926

(22) PCT Filed: Apr. 4, 1997

(86) PCT No.: PCT/JP97/01180

§ 371 Date: Feb. 3, 1998

§ 102(e) Date: Feb. 3, 1998

(87) PCT Pub. No.: WO97/01670

PCT Pub. Date: Jan. 16, 1997

(30) Foreign Application Priority Data

Jun. 29, 1995 (FI) .......................................................... 953238

(51) Int. Cl.[7] .................................................. D21H 17/70
(52) U.S. Cl. .............................. 162/9; 162/100; 162/149; 162/181.2; 162/182
(58) Field of Search ........................... 162/9, 100, 181.2, 162/149, 181.5, 187, 182, 190, 189, DIG. 9; 106/465

(56) References Cited

U.S. PATENT DOCUMENTS

| | | | |
|---|---|---|---|
| 1,443,454 | * | 1/1923 | Booth ...................................... 162/190 |
| 3,262,877 | * | 7/1966 | Le Compte ............................ 162/190 |
| 3,873,418 | * | 3/1975 | Brax ....................................... 162/190 |
| 4,374,702 | | 2/1983 | Turbak et al. . |
| 4,761,203 | | 8/1988 | Vinson . |
| 4,889,594 | * | 12/1989 | Gavelin ................................. 162/190 |
| 4,895,019 | | 1/1990 | Lehmikangas et al. . |
| 5,127,994 | | 7/1992 | Johansson . |
| 5,151,238 | | 9/1992 | Earl et al. . |
| 5,223,090 | | 6/1993 | Klungness et al. . |
| 5,385,640 | | 1/1995 | Weibel et al. . |
| 5,476,228 | | 12/1995 | Underberg . |
| 5,487,419 | | 1/1996 | Weibel . |
| 5,558,782 | * | 9/1996 | Bleakley et al. ...................... 162/190 |
| 5,601,921 | | 2/1997 | Eriksson . |
| 5,679,220 | | 10/1997 | Matthew et al. . |
| 5,731,080 | | 3/1998 | Cousin et al. . |
| 5,733,461 | * | 3/1998 | Bleakley et al. ...................... 162/190 |
| 5,824,364 | | 10/1998 | Cousin et al. . |

FOREIGN PATENT DOCUMENTS

| | | |
|---|---|---|
| 0 604 095 A1 | 6/1994 | (EP) . |
| 0 703 451 | 3/1996 | (EP) . |
| 931584 | 10/1993 | (FI) . |
| 944355 | 10/1994 | (FI) . |
| 2 265 926 | 10/1993 | (GB) . |
| PCT/US93/02372 | 10/1993 | (WO) . |

OTHER PUBLICATIONS

Tom Lindström et al. "Effects of pH and electrolyte concentration on the adsorption of cationic polyacrylamides on cellulose" *Tappi Journal*, vol. 66, No. 6, pp. 83–85, Jun. 1983.

E. Gruber et al. "Wechselwirkungen von synthetischen kationischen Polymeren mit Fasern und Füllstoffen" *Wochenblatt für Papierfabrikation*, pp. 4–11, 1996.

H. Eltsner et al. "Anderung der Faserstruktur beim Recey-lcing . . . " *Wochenblatt für Papierfabrikation* , pp. 5–7. (copy of article to follow; see IDS for relevance), 1991.

N.–E. Virkola: Puumassan Valmistus, Turku 1983, p 685.

INSKO presentation 150–90 IV; Jan. Erik Levlin, MA: Uusiomassan Paperitekniset Ominasisuudet, p. 4.

Sax, N. et al., *Hawley's Condensed Chemical Dictionary*, Eleventh Edition, Published by Van Nostrand Reinhold Company Inc., New York, NY, pp. 736, 979 (1987).

* cited by examiner

Primary Examiner—Peter Chin
(74) Attorney, Agent, or Firm—Merchant & Gould P.C.

(57) ABSTRACT

The invention relates to a filled used in paper manufacture and mainly consisting of calcium carbonate, and to a procedure for producing the filler. The filler consists of porous aggregates formed by precipitated calcium carbonate particles. In the procedure, calcium carbonate is precipitated.

36 Claims, 6 Drawing Sheets

Figure 1:
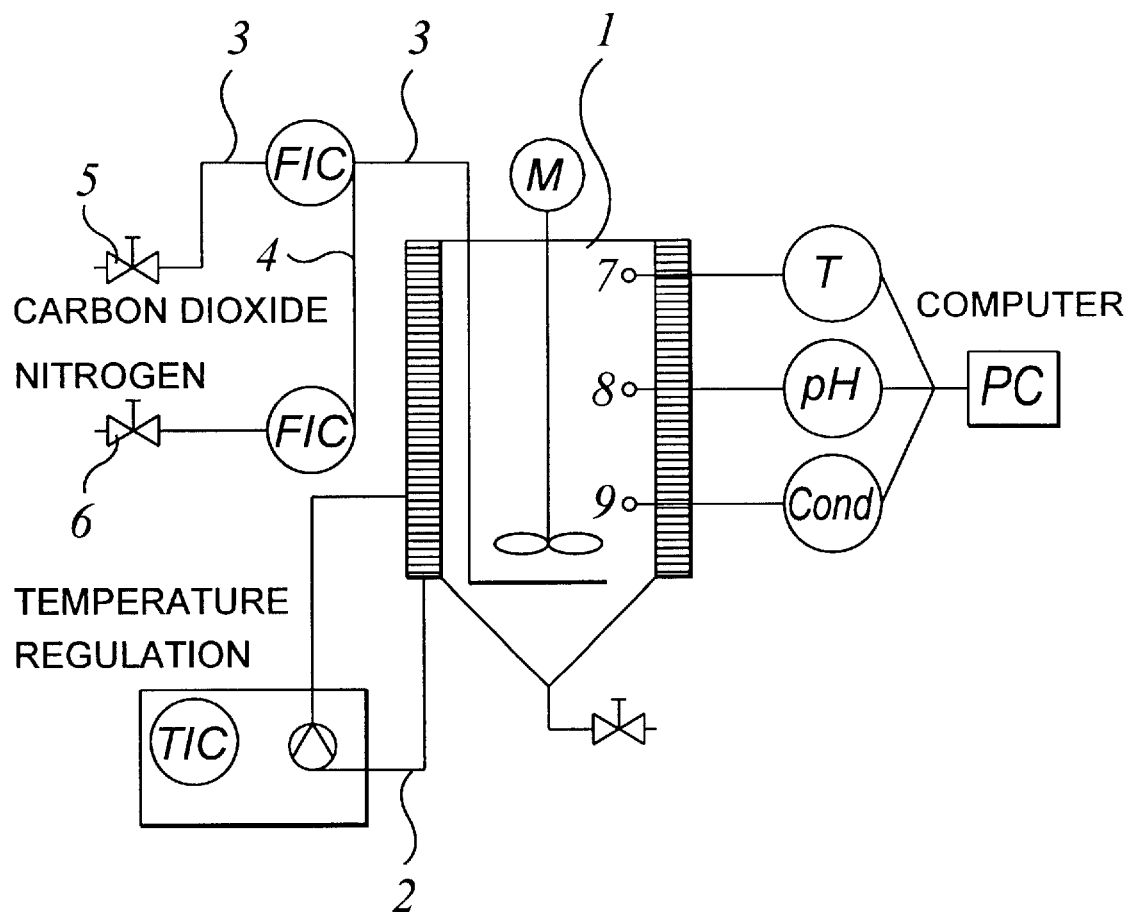

TEST EQUIPMENT USED FOR PRECIPITATION
OF CALSIUM CARBONATE

FILLER FOR USE IN PAPER MANUFACTURE AND PROCEDURE FOR PRODUCING A FILLER

The present invention relates to a filler for use in paper manufacture as defined in the preamble of claim 1. Moreover, the invention relates to a procedure for producing said filler.

In the present application, 'paper' refers to various kinds of paper and cardboard, manufactured with paper and cardboard machines, coated or uncoated.

Today, the direction of development of paper products is to an increasing degree determined by customers and legislative measures. The buyers of printing paper want to reduce the postage expenses and the amount of waste produced. Further, packages are subject to waste processing charges dependent on weight. Generally, it seems that energy taxes and environmental protection taxes are being imposed on the price of paper products as a permanent extra encumbrance. For these reasons, paper buyers want products which have a lower grammage while still meeting high quality standards.

Specification FI 931584 presents a composite product based on chemical pulp fibre or mechanical pulp fibre, with calcium carbonate crystals precipitated onto the surface of the product. Further, specification FI 944355 presents a precipitated calcium carbonate, which is in the form of calcite particle aggregates where at least 25% of the particles are of a prismatic shape. Precipitation is performed using a seed material. Further, specification EP 0604095 presents a procedure for the processing of waste material whereby calcium carbonate is precipitated onto the surface of waste material containing inorganic matter; the waste material may contain organic waste fibre, e.g. waste fibre contained in the effluent of a paper mill, with fibre length below 75 $\mu$m. The calcium carbonate products described in the specifications referred to are intended to be used as fillers in paper manufacture.

In the manufacture of high-quality paper, the aim is to produce the paper with a minimum amount of raw material. When the grammage of the paper is reduced, its opacity becomes a critical factor. The opacity can be increased by increasing the filler content of the paper, which, however, generally reduces its strength. Therefore, the aim is to alter the structure of the paper while at the same time preserving the important good product qualities. For paper based communication to remain competitive in relation to electric communication, the printing quality of paper products has to be further improved. These general development trends impose very high requirements on the raw materials and manufacturing processes used in paper production. To meet the requirements, very intensive efforts have been made in recent times to develop paper raw materials and manufacturing processes.

The object of the present invention is to produce a new kind of calcium carbonate based filler for paper manufacture that meets the criteria described above.

A further object of the invention is to produce a new kind of calcium carbonate based filler which has better optic properties than earlier calcium carbonate based fillers.

A further object of the invention is to produce a new kind of calcium carbonate based filler which gives the paper better strength properties, especially a better tensile strength, than earlier calcium carbonate based fillers.

A further object of the invention is to produce a new kind of calcium carbonate based filler which gives the paper a lower grammage than earlier calcium carbonate based fillers.

A further object of the invention is to produce a new kind of calcium carbonate based filler which has a higher retention than earlier calcium carbonate based fillers.

A further object of the invention is to produce a new kind of calcium carbonate based filler which reduces the overall costs of paper manufacture.

An additional object of the invention is to present a procedure for the manufacture of said filler.

As for the features characteristic of the invention, reference is made to the claims.

The invention is based, among other things, on the fact, established via corresponding investigations, that calcium carbonate can be precipitated in a way that causes it to effectively adhere to fibres and noil fibrils. The precipitation can be so performed that porous calcium carbonate aggregates held together by fibrils, i.e. fine fibres, are formed, which aggregates contain plenty of empty space and in which the calcium carbonate particles have precipitated onto the noil fibrils, adhering to them. The noil fibrils with calcium carbonate particles precipitated on them form fibres resembling pearl necklaces, and the calcium carbonate aggregates resemble clusters of pearl necklaces. The aggregates have a very large ratio of effective volume to mass as compared with the corresponding ratio of conventional calcium carbonate used as filler; effective volume here means the volume taken up by pigment in the paper.

The noil fibrils used in the filler of the invention are obtained from cellulose fibre and/or mechanical pulp fibre. The fibrils are produced from cellulose fibre and/or mechanical pulp fibre by refining. Furthermore, the noil fibrils are preferably divided into fractions, thickness 0.1–2 $\mu$m, length mainly 10–400 $\mu$m, suitably 10–300 $\mu$m, preferably 10–150 $\mu$m. Thus, the noil fibrils consist of cellulose fibre and/or mechanical pulp fibre, which means that they contain no significant amounts of inorganic matter, preferably no inorganic matter at all.

The diameter of the calcium carbonate particles in the aggregate is of the order of about 0.2–3 $\mu$m, preferably about 0.3–1.5 $\mu$m.

The diameter of the $CaCO_3$ crystal aggregates is of the order of about 2–10 $\mu$m.

Cellulose based noil also contains roundish noil particles which, after the precipitation process, are covered with calcium carbonate particles. In this case, as to its properties, a particle of calcium carbonate filler corresponds in the first place to a hollow filler particle having a small unit weight. In reality, the pigment is not completely hollow, because it contains noil; however, the noil has a lower unit weight than calcium carbonate, therefore the particle has a very low unit weight.

The new precipitated, calcium carbonate based filler of the invention bestows paper better optic properties and a clearly greater strength than prior-art calcium carbonate based fillers do. Furthermore, the filler of the invention allows the filler content of paper to be increased without impairing its other properties, e.g. the aforementioned strength properties, such as tensile strength. This is a significant contribution towards lowering the grammage of paper.

Further, the new filler of the invention has a clearly better retention in paper manufacture than prior-art calcium carbonate based fillers.

In consequence of the aforesaid factors, it is generally possible to achieve cost savings in paper manufacture by using the filler of the invention.

In prior art, light filler pigments are known, e.g. hollow plastic pigments, which are supposed to provide the same advantages as the calcium carbonate based filler of the present invention. However, plastic pigments are expensive, which restricts their use. When the filler of the invention is compared with pore filled or lumen filled fibre, it is to be noted that, unlike in the case of aforesaid fibres, the calcium carbonate in the filler of the invention is not inside individual noil fibres but on the surface of the noil. In addition, the mass ratio of calcium carbonate and fibrous matter is much larger in the filler of the invention than in pore filled or lumen filled fibre. Thus, the filler of the invention is a completely new product, and it should not be confused with prior-art pore filled or lumen filled fibre.

The filler of the invention and the procedure for its manufacture differ from the specification FI 931584 referred to in the introduction especially on the basis of the thickness and length of the noil fibrils, i.e. in the present application, the noil fibrils have been refined with a pulp refiner. From the filler and manufacturing method described in specification FI 944355, the filler and manufacturing method of the present invention likewise differ in respect of the refined noil fibrils; in addition, in the specification referred to, the calcite particles are of a prismatic shape and their production requires the use of a special seed material. With respect to the product and procedure presented in specification EP 0604095, the product and procedure of the present invention likewise differ on the basis of the refinement and size of the noil fibrils; in addition, the fibre material used in the specification referred to is waste fibre containing inorganic or other matter. In general, in addition to the differences stated above, the filler of the present invention differs from those described in the reference specifications on the basis of the good optic properties, strength properties and very high retention achieved, and especially on the basis of the combination of exceptionally good optic and strength properties.

The fibre used in the procedure of the invention may consist of chemical, mechanical or semi-mechanical pulp produced by any pulp or paper manufacturing method known in itself, or a combination of these in arbitrary proportions, the proportion of each component being 0–100% by weight. The refining of the pulp into noil fibrils can be implemented using any pulp refiner known in itself in pulp processing industry. When desirable, the refined noil fibrils can be screened by any fractionating method known in itself in pulp processing, e.g. using a wire screen, into the desired fibril size.

In precipitation, the noil, i.e. e.g. pulp based or other fibre based noil, is refined with a pulp refiner and screened, preferred fractions being e.g. wire screen fractions P100–P400.

In the procedure of the invention, calcium carbonate can be precipitated from any suitable solution or mixture, e.g. from a mixture of $Ca(OH)_2$ water solution and solid $Ca(OH)_2$ or from a calcium hydroxide water solution. Thus, precipitation can be implemented using any substance that precipitates calcium carbonate, e.g. carbon dioxide, such as gaseous carbon dioxide, suitably 1–100%, preferably 10–100% carbon dioxide gas. Instead of calcium hydroxide and carbon dioxide, it is possible to use any reaction producing calcium carbonate, e.g. the reaction between calcium chloride and sodium carbonate, producing calcium carbonate and sodium chloride.

The precipitation of calcium carbonate is performed on the surface of noil originating from cellulose fibre, suitably noil fibrils. The concentration of noil in the precipitation process is suitably 0.0001–18 w-%, preferably 0.4–10 w-%. When calcium hydroxide is used, the mass ratio of calcium hydroxide and cellulose fibres in precipitation is suitably 0.1–20, preferably 1.4–4. The precipitation temperature is in the range 5–150° C., suitably 10–90° C., preferably 15–80° C.

In the carbon dioxide method, the net reaction is

In the chloride method, the net reaction is

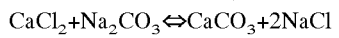

Calcium carbonate precipitates when the calcium compounds react according to the reaction equations. It is possible to influence the crystal size and/or shape by adjusting the reaction conditions.

The precipitation can be advantageously effected in a specific reactor where e.g. calcium hydroxide and noil are mixed. The carbonation reaction is implemented by supplying carbon dioxide, e.g. gaseous carbon dioxide, into the reactor. The progress of the reaction can be monitored by measuring the pH and conductivity of the mixture. The mixing and the supply of gas can be terminated when the pH of the mixture has fallen to the value of about 7.5, depending on the pH value of the noil. The carbonation is carried out e.g. in a water solution or mixture of $Ca(OH)_2$.

If desirable, it is possible to add a dispersing agent, e.g. sodium hexametaphosphate (Na-HMF) or other dispersing agent(s), into the filler produced.

The filler of the invention can be used as filler as such or in any ratio of mixture (0–100%) with another filler or other fillers. The amount of filler used in paper is 0.1–50 w-%, preferably 0.1–30 w-%.

Figure 2:
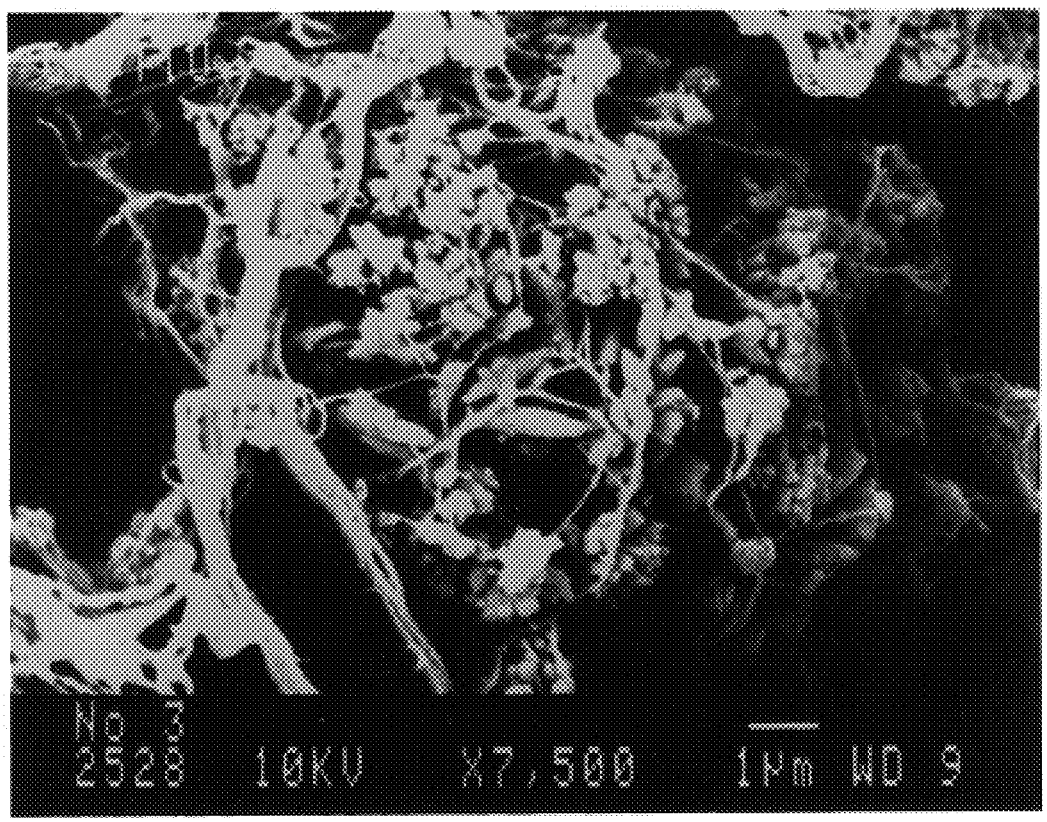
Figure 3:
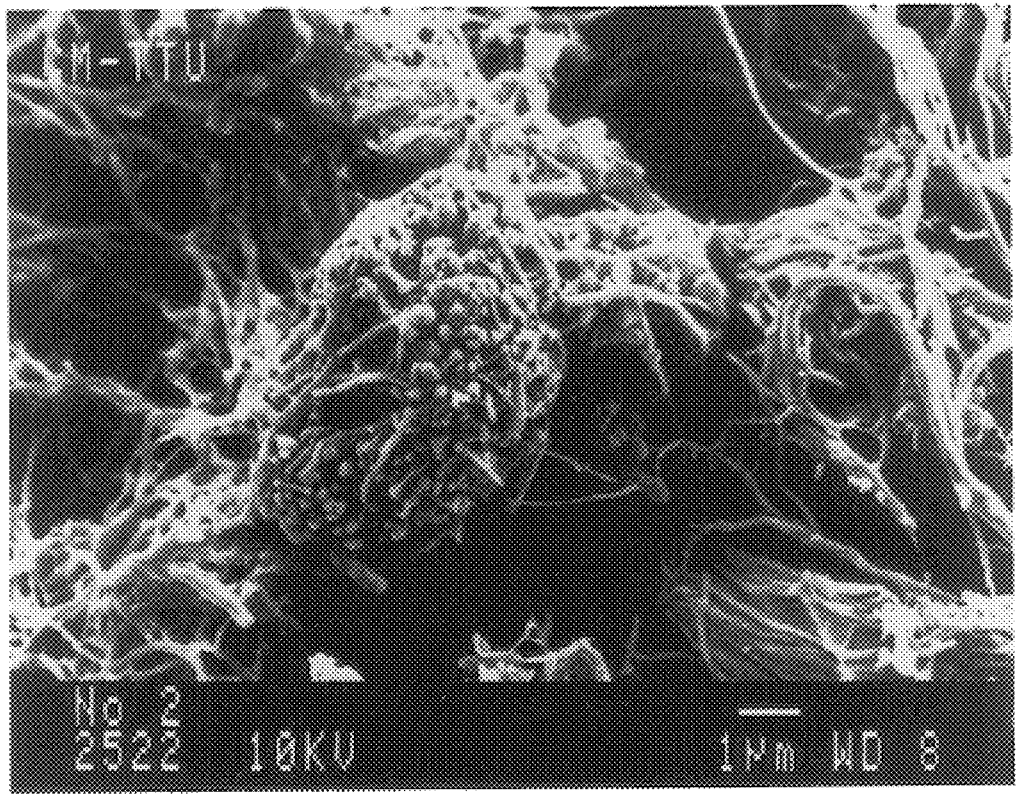
Figure 4:
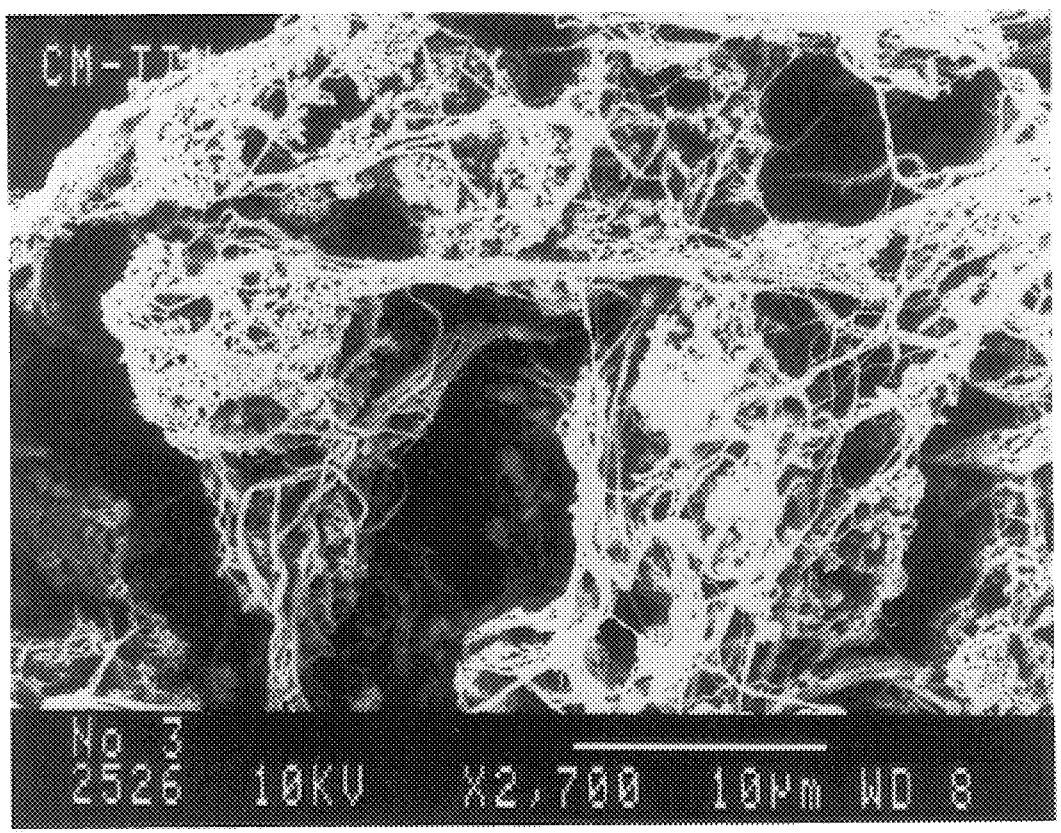

The filler of the invention and the procedure for its manufacture are described in more detail in the following embodiment examples by referring to the attached drawings, in which FIG. 1 presents the equipment used in the procedure of the invention;

FIGS. 2–4 present pictures taken of the filler of the invention by means of an electron microscope;

FIGS. 5–8 present graphs representing the properties of the filler of the invention as compared with those of a prior-art filler.

EXAMPLE 1

Production of Filler

Bleached pine sulphate pulp was refined in a Valley laboratory hollander in accordance with the SCAN-C 25:-76 standard for 2.5 hours. The refined pulp was screened by means of a Bauer-McNett screen, initially using the wire sequence 14–50–100–200 mesh. The amount of dry matter screened at a time was 45 g. The fraction passed through the 200 mesh wire (P200 fraction) was saved and allowed to settle for 2 days, whereupon the aqueous phase on its surface was separated.

The P200 fraction was further fractionated with the wire sequence 100–200–290–400 mesh. The 100 mesh wire was used to equalize the screening process and prevent the 200 mesh wire from getting blocked at the initial stage. The fraction passed through the 400 mesh wire (P400 fraction) was saved and, after the noil fraction had settled, the aqueous phase on the surface was separated.

The P400 fraction was thickened by centrifugation to a consistency of 4.7 g/l, whereupon the noil was ready for use in the production of a filler.

The filler was produced in a mixing tank reactor 1, FIG. 1. The reactor had a capacity of 5 liters and its temperature could be regulated via a water circulation system 2 in its casing. The reactor contained four vertical foul plates designed to increase the mixing efficiency. A gas mixture of carbon dioxide and nitrogen was supplied via a pipe 3 to a point below the mixer element. The flow and carbon dioxide content of the gas mixture could be adjusted by means of control valves 5, provided in the gas pipes 3, 4. Measuring sensors 7, 8, 9 were placed in the reactor via holes in the cover. The measuring elements were connected to a computer 10, in which the measurement data was collected and stored.

Precipitation was performed at a temperature of 35° C. and the carbon content of the gas mixture was adjusted to a value of 15% by volume; the reaction volume was 3.2 l.

The filler was produced using three different $Ca(OH)_2$/noil ratios. The proportions of raw materials are presented in Table 1.

TABLE 1

| | Proportions of raw materials | | |
|---|---|---|---|
| | Precipitation 1 | Precipitation 2 | Precipitation 3 |
| $m_{noil}$, g | 15 | 15 | 15 |
| $m_{Ca(OH)2}$, g | 22 | 35 | 50 |
| $V_{nitrogen}$, l/min | 5.25 | 8.36 | 11.94 |
| $V_{carbon\ dioxide}$, l/min | 0.93 | 1.48 | 2.11 |

Before the reaction was started, the noil was homogenized by mixing it in the reactor for 5 min at a mixing speed of 600 l/min. At this stage, a small nitrogen flow was used to prevent the gas pipes from getting blocked. After this, the mixing speed was adjusted to the value 1000 l/min, and calcium hydroxide was added into the reactor. The measuring sensors were placed in the reactor and the reaction was started by opening the $CO_2$ flow as well. The progress of the reaction was monitored by measuring the pH, 8, and conductivity, 9, of the mixture. The mixing and gas supply were stopped when the pH, 8, had fallen to the value 7.5.

Pictures of the product obtained were taken with an electron microscope (SEM), FIGS. 2, 3, 4. From the SEM pictures it can be seen that the product consists of porous calcium carbonate aggregates held together by noil fibrils and containing plenty of empty space, with $CaCO_3$ particles precipitated onto the noil fibrils, adhering to them. The calcium carbonate particles in the aggregate have a diameter of 0.3–1.5 μm and a roundish and partly shuttle-like shape. The diameter of the aggregates varies between about 2–10 μm. The noil/$CaCO_3$ fibrils can be described as resembling pearl necklaces and the aggregates as resembling clusters of pearl necklaces. There are also roundish noil particles (FIG. 3), and these are covered with tiny $CaCO_3$ particles. In this case, we can even speak of a hollow $CaCO_3$ pigment, which has a low unit weight (the pigment is not completely hollow because there is some noil inside it; however, noil has a lower unit weight than calcium carbonate). According to an X-ray diffraction analysis, 100% of the precipitated calcium carbonate consisted of calcite.

EXAMPLE 2

Properties of Paper

To test the technical potential of the filler in paper manufacture, a series of sheet tests were performed, in which the properties of the paper were compared when two fillers as provided by the invention and calcium carbonate fillers already available in the market, PCC (Albacar LO) and GC (Fincarb 6005) were used.

For the production of laboratory sheets, a pulp mixture containing 75 w-% bleached mechanical pulp and 25 w-% bleached pine sulphate pulp was prepared. The pulp was refined in a Valley laboratory hollander to SR number 30 in accordance with the SCAN-C 25:76 standard, the refining time being 38 min.

The fillers obtained from precipitations 1 and 2 presented in FIG. 1 were used undiluted in the production of laboratory sheets, and the filler from precipitation 3 was diluted to one half of its consistency after precipitation. For the production of reference sheets, solutions having a consistency of 25 g/l were prepared from commercial $CaCO_3$ fillers.

In a laboratory sheet mould, 60 g/m² sheets were produced without circulation water according to the standards SCAN-C 26:76 and SCAN-M 5:76 except for drum drying and corresponding wet pressing of the sheets. As retention agents, cationic starch (Raisamyl 135) 0.65% and silica 0.15% of the fibre mass were used.

For wet pressing corresponding to drum drying, the sheets were piled up as follows:

Top of pile→press plate 2 dried blotting boards new blotting board laboratory sheet couching board 2 dried blotting boards Bottom of pile→press plate The sheet pile was placed in the press and it was pressed by applying a pressure of 490±kPa to the sheets for 4 minutes. After the wet pressing, the blotting boards on either side of the sheets were left sticking to the sheets and the sheets were placed in a cold drying drum. The sheets were dried in the drum at a temperature of 1000° C. for 2 h. After the drying, the blotting boards were released from the sheets and the sheets were seasoned for at least 24 h at a temperature of 23±1° C., the relative humidity being 50±2%.

For the finished sheets, the calcium carbonate content, grammage, ISO whiteness, light-scattering coefficient and tensile index were determined. The results are presented in Tables 2, 3 and 4.

TABLE 2

| | Paper properties obtained using a filler as provided by the invention | | | | | |
|---|---|---|---|---|---|---|
| | Precipitation 1 | | Precipitation 2 | | Precipitation 3 | |
| $CaCO_3$ content, % | 10.2 | 15.8 | 12.1 | 17.1 | 12.8 | 17.7 |
| grammage, g/m² | 65.0 | 66.3 | 65.1 | 65.6 | 65.0 | 66.0 |
| Iso whiteness, % | 72.4 | 75.0 | 73.1 | 75.9 | 74.0 | 76.8 |
| light-scattering coeff., m²/kg | 74.4 | 82.6 | 77.0 | 87.2 | 78.6 | 90.3 |
| tensile index, Nm/g | 48.8 | 47.4 | 50.0 | 44.9 | 45.4 | 40.7 |

TABLE 3

| | Paper properties obtained using commercial $CaCO_3$ fillers | | | | | |
|---|---|---|---|---|---|---|
| | PCC | | | GC | | |
| $CaCO_3$ content, % | 11.8 | 18.3 | 22.9 | 11.6 | 18.0 | 22.0 |
| grammage, g/m² | 65.1 | 68.3 | 66.7 | 67.5 | 63.6 | 68.4 |
| Iso whiteness, % | 73.1 | 75.0 | 76.1 | 72.6 | 73.7 | 74.5 |
| light-scattering coeff., m²/kg | 76.8 | 85.8 | 88.4 | 72.8 | 77.5 | 82.4 |
| tensile index, Nm/g | 33.3 | 28.4 | 26.6 | 36.9 | 31.6 | 28.7 |

Calcium carbonate retention was on an average 92% for the filler of the invention, 64% for commercial precipitated calcium carbonate (PCC) and 62% for commercial ground calcium carbonate (GC).

TABLE 4

Paper properties with mere pulp without filler

| | |
|---|---|
| $CaCO_3$ content, % | 0 |
| grammage, g/m² | 64.7 |
| Iso whiteness, % | 71.2 |
| light-scattering coeff., m²/kg | 62.0 |
| tensile index, Nm/g | 56.2 |

Figure 5:
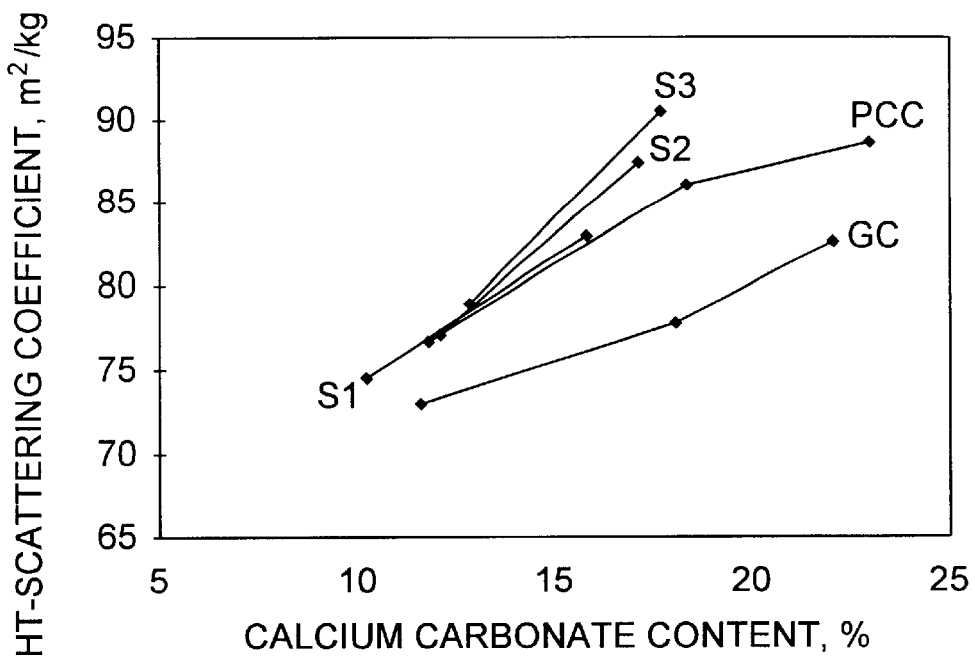
Figure 6:
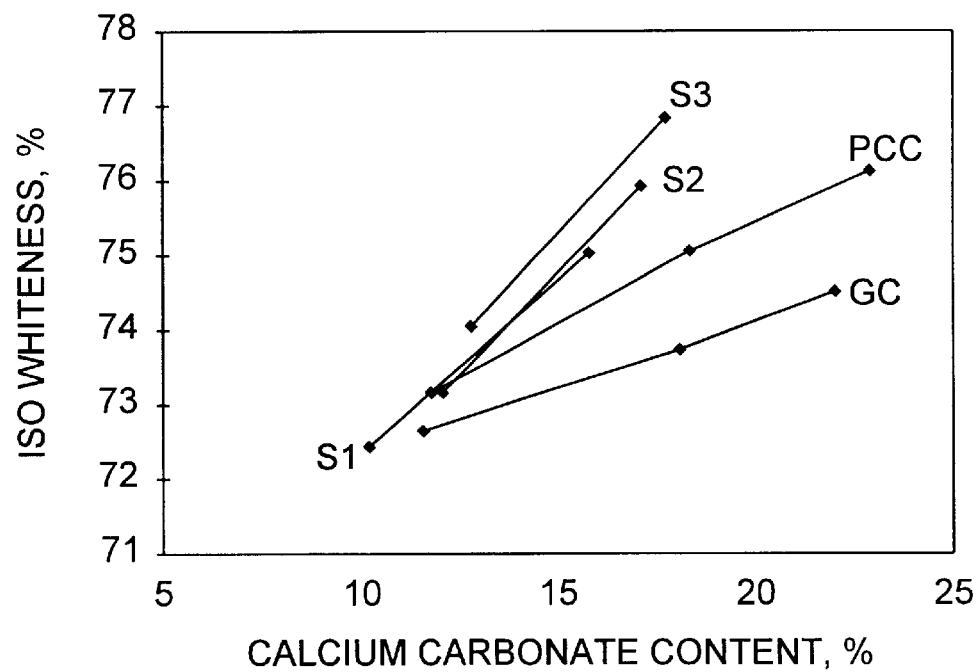
Figure 7:
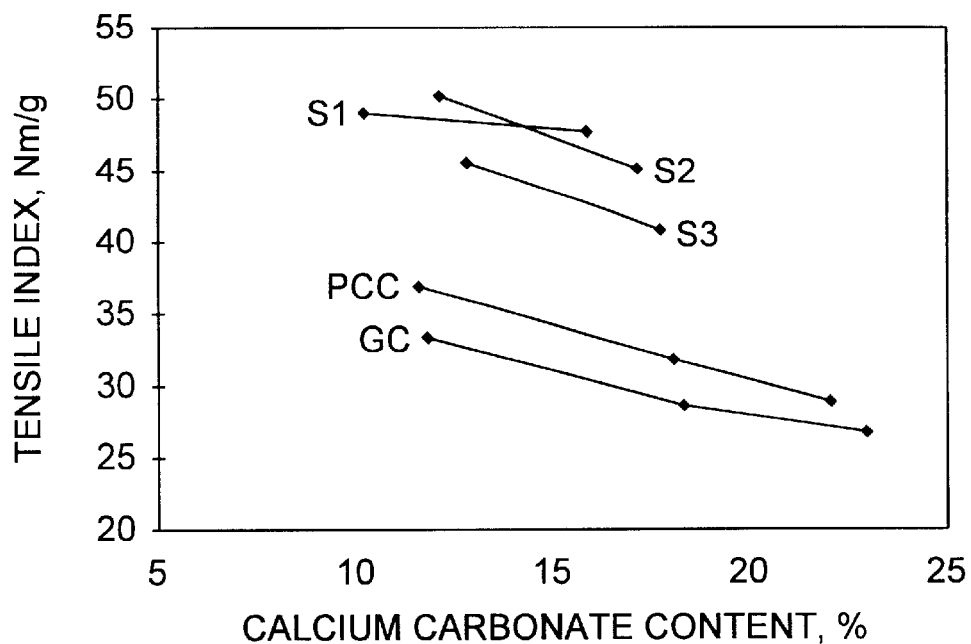
Figure 8:
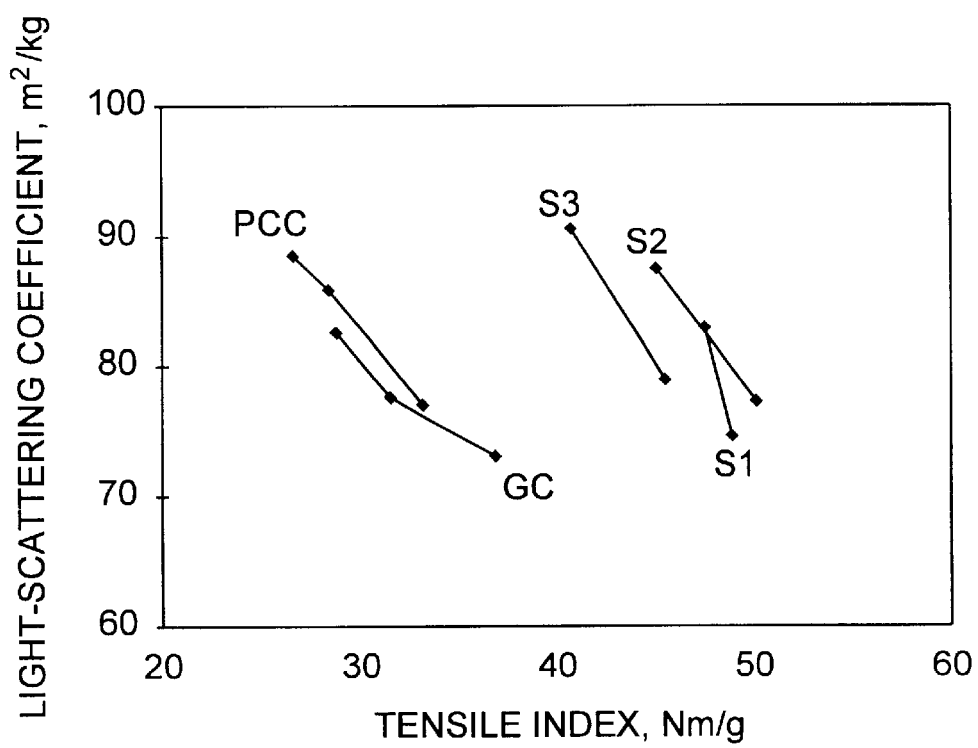

FIGS. 5–8 present the results in the form of graphs. In FIG. 5–8, the references S1, S2 and S2 correspond to the results shown in the table with fillers obtained from precipitations 1, 2 and 3, respectively; the references PCC and GC indicate results obtained with commercial precipitated calcium carbonate and ground calcium carbonate, respectively. FIGS. 5 and 6 indicate that the filler of the invention has better optic properties as compared with the corresponding properties with commercial $CaCO_3$ fillers used in the same $CaCO_3$ contents. FIG. 7 shows that the tensile strength in the case of the filler of the invention is clearly better than in the case of commercial $CaCO_3$ fillers used in the same $CaCO_3$ contents. In addition, FIG. 8 shows the light-scattering coefficient as a function of the tensile index. In this survey, both the optic properties of the paper and its runnability on a paper machine are considered. In this survey, the filler of the invention is clearly better than commercial $CaCO_3$ fillers. In other words, with the same light-scattering coefficient values, the filler of the invention gives a clearly better tensile strength than do commercial $CaCO_3$ fillers. From the graphs we can see a trend of improving optical properties and decreasing tensile strength of the paper as the ratio $m_{CA(OH)2}/m_{noil}$ in precipitation increases.

The excellent properties of the new type of porous $CaCO_3$ filler described in the foregoing allow the $CaCO_3$ content to be increased and the grammage of paper to be further reduced without impairing other important qualities of paper. Considering the improved retention of the filler of the invention in paper manufacture, the aforesaid good results together also allow cost savings to be achieved.

The embodiment examples are intended to illustrate the invention without limiting it in any way.

What is claimed is:

1. A method for producing filler for use in paper manufacture, the method comprising:
   (a) refining and screening wood pulp to provide a fractionated fibrils fraction that passes through a 100 mesh wire; and
   (b) chemically precipitating calcium carbonate onto the surface of the fractionated fibrils fraction to provide a porous aggregate of calcium carbonate precipitated onto the surface of fibrils.

2. A method according to claim 1, wherein the wood pulp comprises mechanical pulp fibre.

3. A method according to claim 1, wherein the wood pulp comprises chemical pulp fibre.

4. A method according to claim 1, wherein the wood pulp comprises semi-mechanical pulp.

5. A method according to claim 1, wherein the step of precipitating calcium carbonate onto the surface of the fractionated fibrils fraction comprises reacting calcium hydroxide and carbon dioxide.

6. A method according to claim 5, wherein the mass ratio of calcium hydroxide and fibrils is 0.1:1 to 20:1.

7. A method according to claim 5, wherein the mass ratio of calcium hydroxide and fibrils is 1.4:1 to 4:1.

8. A method according to claim 1, wherein the step of precipitating calcium carbonate onto the surface of the fractionated fibrils fraction comprises reacting calcium chloride and sodium carbonate.

9. A method according to claim 8, wherein the mass ratio of calcium chloride to fibrils is between 0.15:1 and 30:1.

10. A method according to claim 8, wherein the mass ratio of calcium chloride to fibrils is between 2.1:1 and 6:1.

11. A method according to claim 1, wherein said step of precipitating calcium carbonate onto the surface of the fractionated fibrils comprises providing a concentration of fibrils of 0.001 wt. % to 18 wt. %.

12. A method according to claim 1, wherein said step of precipitating calcium carbonate onto the surface of the fractionated fibrils comprises providing a concentration of fibrils of 0.4 wt. % to 10 wt. %.

13. A method according to claim 1, wherein the fractionated fibrils fraction has an average thickness of 0.1–2 μm and an average length of 10–400 μm.

14. A method according to claim 1, wherein the fractionated fibrils fraction is provided which passes through a 200 mesh wire.

15. A method according to claim 1, wherein the step of precipitating comprising precipitating at a temperature of between 5° C. and 150° C.

16. A method according to claim 1, wherein the step of precipitating comprising precipitating at a temperature of between 10° C. and 90° C.

17. A method according to claim 1, wherein the step of precipitating comprising precipitating at a temperature of between 15° C. and 80° C.

18. A method according to claim 1, wherein the step of precipitating calcium carbonate onto the surface of the fractionated fibrils comprises providing a concentration of fibrils of 0.0001 wt. % and 18 wt. %.

19. A method according to claim 1, wherein the porous aggregate comprises calcium carbonate having an average diameter of 0.2 μm to 3 μm.

20. A method according to claim 1, wherein the porous aggregate has an average diameter of 2 μm to 10 μm.

21. A method according to claim 1, wherein said step of precipitating calcium carbonate onto the surface of the fractionated fibrils comprises providing a concentration of fibrils of 0.4 wt. % to 10 wt. %.

22. A method according to claim 1, wherein said step of refining and screening wood pulp further comprises providing a fractionated fibrils fraction that passes through a 200 mesh wire.

23. A method according to claim 13, wherein the fractionated fibrils fraction has an average length of 10–300 μm.

24. A method according to claim 13, wherein the fractionated fibrils fraction has an average length of 10–150 μm.

25. Porous aggregate prepared according to the method of claim 1.

26. Filler for use in paper manufacture comprising:
   (a) porous aggregate of calcium carbonate chemically precipitated onto the surface of a fractionated fibril fraction;
   (b) the fractionated fibrils fraction being produced by refining and screening wood pulp to provide a fractionated fibrils fraction that passes through a 100 mesh wire; and
   (c) the calcium carbonate precipitated onto the surface of the fractionated fibrils fraction having an average diameter of 0.2 μm to 3 μm.

27. A filler according to claim 26, wherein the wood pulp comprises mechanical pulp fibre.

28. A filler according to claim 26, wherein the wood pulp comprises chemical pulp fibre.

29. A filler according to claim 26, wherein the wood pulp comprises semi-mechanical pulp.

30. A filler according to claim 26, wherein the fractionated fibrils fraction comprises a fractionated fibrils fraction that passes through a 200 mesh wire.

31. A filler according to claim 26, wherein the fractionated fibrils fraction has an average length of 10–400 μm.

32. A filler according to claim 26, wherein the fractionated fibrils fraction has an average length of 10–300 μm.

33. A filler according to claim 26, wherein the fractionated fibrils fraction has an average length of 10–150 μm.

34. A filler according to claim 26, wherein the porous aggregate has an average diameter of 2 μm to 10 μm.

35. A filler according to claim 26, wherein the average diameter of the calcium carbonate precipitated onto the surface of the fractionated fibrils fraction is about 0.2 μm to 3 μm.

36. A filler according to claim 26, wherein the average diameter of the calcium carbonate precipitated onto the surface of the fractionated fibrils fraction is about 0.3 μm to 1.5 μm.

* * * * *

UNITED STATES PATENT AND TRADEMARK OFFICE
CERTIFICATE OF CORRECTION

PATENT NO. : 6,251,222 B1
DATED : June 26, 2001
INVENTOR(S) : Silenius et al.

It is certified that error appears in the above-identified patent and that said Letters Patent is hereby corrected as shown below:

Title page,
Item [22], PCT Filed: "Apr. 4, 1997" should read -- Jun. 27, 1996 --
Item [86], PCT No.: "PCT/JP97/01180" should read -- PCT/FI96/00379 -- and
§ 371 Date: "Feb. 3, 1998" should read -- Mar. 5, 1998 -- and
§ 102(e) Date: "Feb. 3, 1998" should read -- Mar. 5, 1998 --
Item [56], References Cited, FOREIGN PATENT DOCUMENTS,
"2 265 926" should read -- 2 265 916 --

Column 5,
Line 5, "valves 5" should read -- valves 5, 6 --

Signed and Sealed this

Fifteenth Day of June, 2004

JON W. DUDAS
*Acting Director of the United States Patent and Trademark Office*